United States Patent Office 2,943,108
Patented June 28, 1960

2,943,108
MANUFACTURE OF CARBAMATES FROM AMIDES

Jack S. Newcomer, Wilson, Keith J. Smith, Lockport, and Jerome Linder, Niagara Falls, N.Y., assignors to Hooker Chemical Corporation, Niagara Falls, N.Y., a corporation of New York No Drawing. Original application Jan. 21, 1955, Ser. No. 483,436, now Patent No. 2,860,166, dated Nov. 11, 1958. Divided and this application Mar. 31, 1958, Ser. No. 729,046

13 Claims. (Cl. 260—471)

This invention relates to a new method for the transformation of amides to carbamates.

It is an object of this invention to provide a process for the conversion of amides to carbamates wherein the extent of the undesirable side reaction is reduced to a negligible figure. A second object is to affect the dehydrochlorination and rearrangement reaction in high yields. A third object is to affect the reaction without the hydrolysis of the amide to the undesirable acid salt and ammonia. A fourth object is to affect the reaction without the hydrolysis of the carbamate to the undesired amine and carbon dioxide. A fifth object is to affect the reaction to produce carbamates in high yields even in the presence of substantial percentages of water. A sixth object is to affect the reaction to produce carbamates in high yield even in the presence of substantial percentages of water and also at temperatures considerably above room temperature. A seventh object is to affect the reaction to produce carbamates in high yields without the use of refrigeration. An eighth object is to provide a reaction for the conversion of amides to carbamates which is easily controlled. A ninth object is to provide a successful method for the preparation of chloroalkyl carbamates in high yields by the reaction of amides with halogen-containing alcohols without affecting the dehydrochlorination of the chloro-alcohol or of the resulting choloralkyl carbamate. A tenth object is to provide a method for converting amides to carbamates in high yields which does not require the use of expensive reagents. An eleventh object is to provide a method which does not require expensive equipment for the preparation, reaction, and recovery of the chemical materials involved.

These and other objects are accomplished by the invention described herein as will become more apparent hereinafter.

PRIOR ART

Although the conversion of amides to carbamates has found rather wide use as an academic laboratory reaction (Organic Reactions, vol. III, John Wiley & Sons, 1947, pages 267–306), there has been very little commercial application of the reaction because of certain undesirable characteristics inherent in the nature of the processes available in the literature. Fundamentally the art has taught that the conversion of an amide to a carbamate required the following three reactions:

(a) Reaction of the amide with an halogenating agent to form an N-chloroamide by chlorination:

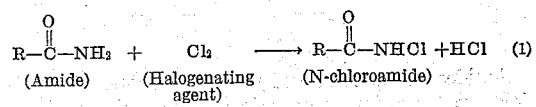

(b) Reaction of the N-chloroamide with a strong alkali to form an isocyanate by dehydrochlorination and rearrangement:

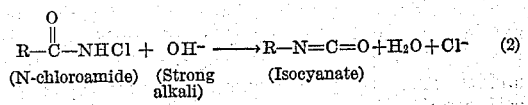

and (c) Reaction of the isocyanate with an alcohol to form a carbamate by addition:

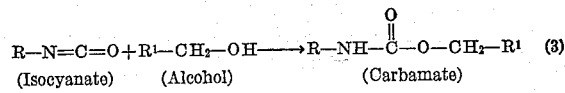

where R and R¹ are organic radicals.

Since all ingredients (amide, halogenating agent, strong alkali, and an alcohol) are usually present at the same time, numerous side reactions are possible. For example, the strong alkali may react with the amide to both liberate ammonia and form a salt of an organic acid, which are undesirable hydrolysis products. This side reaction is illustrated by Equation 4:

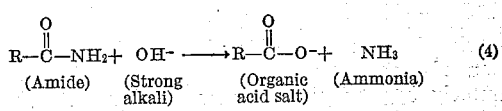

The ammonia which is formed may react with the halogen to form the highly explosive nitrogen trihalides which may decompose suddenly to nitrogen and chlorine.

Another side reaction involves reaction of the strong alkali with the carbamate to form upon hydrolysis an undesired amine. This reaction is illustrated by Equation 5:

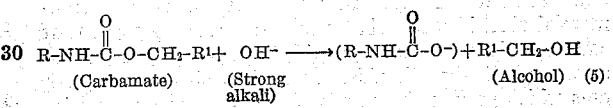

The product

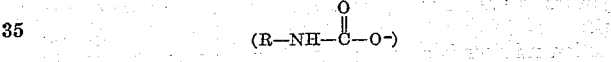

is exceptionally unstable and decomposes to produce an amine and carbon dioxide. Still another side reaction involves reaction of the strong alkali with the alcohol, such as may occur when the alcohol contains halogen groupings. This dehydrochlorination reaction is illustrated by Equation 6:

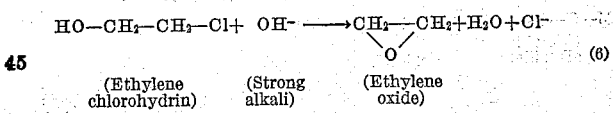

Because of this, it has not been feasible to use these type alcohols in the conversion of amides to their corresponding carbamates.

A fourth side reaction involves the reaction of the strong alkali with chloroalkyl carbamates. This type of dehydrochlorination reaction is illustrated by Equation 7:

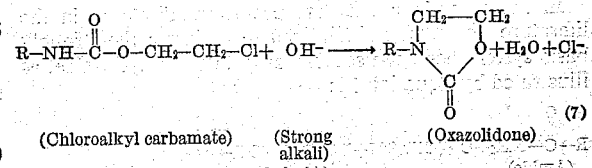

A fifth side reaction which may be attributed to the strong alkali involves reaction of the halogenating agent with the alkali such that the halogenating agent is converted to an inorganic chloride, which is incapable of halogenating the amide.

While an alkali is necessary to promote the desired reaction, it has been observed that the above undesirable side reactions are caused by the presence of the hydroxyl group (OH⁻). The literature describes the use of two types of strong alkali systems to promote the rearrangement of amides to carbamates. The favored procedure calls for the use of metallic alkoxide as the strong alkali, as illustrated by Equation 8:

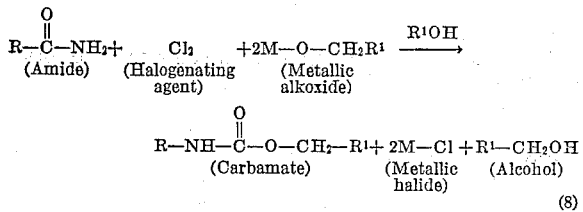
(8)

Although metallic alkoxides, when anhydrous and when placed in an anhydrous system, do not give rise to hydroxyl groups, the use of such materials presents serious disadvantages which have limited this method for affecting the rearrangement, at the best, to small scale manufacturing operations. Further, since two moles of metallic alkoxide are required for each mole of amide, the high cost of metallic alkoxides alone has been sufficient to prohibit the use of this method for affecting the conversion from being considered for the large scale production of carbamates. Still further, alkoxides are so extremely hygroscopic that mere exposure to the atmosphere converts them to the alcohol and caustic; and hence, to hydroxyl groups as illustrated by Equation 9:

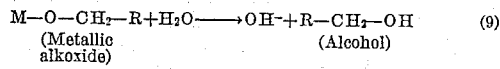
(9)

The hydroxyl groups from the caustic thus formed, then promote the above described undesirable side reactions. Another factor of importance concerns the fact that commercial alkoxides contain up to two percent by weight of caustic. Hence, when alkoxides are employed as the strong alkali, the alkoxides, as well as all other ingredients which go into the reaction, must be thoroughly dried and meticulous precautions must be taken to prevent exposure to even a small amount of water. As little as one percent of water (or molar caustic equivalent) in the reaction mixture is sufficient to allow the side reactions to go rampant without the formation of any, or at the best, only a few percent yield of carbamate. A further disadvantage of the use of metallic alkoxides is the fact that being extremely strong bases, they react with chlorinated alcohols even under strictly anhydrous conditions. This type of reaction is illustrated by Equation 10:

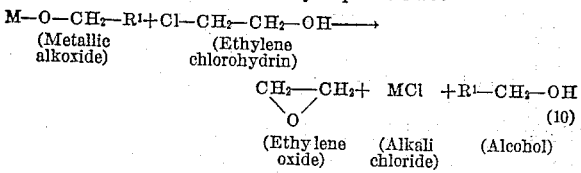
(10)

Therefore, it has been impossible to prepare chloroalkyl carbamates by reacting amides with chlorinated alcohols, such as ethylene chlorohydrin, using metallic alkoxides as the strong alkali for affecting the reaction.

In the second or alternate procedure disclosed in the literature, the strong alkali used to maintain the strongly basic system has been sodium or potassium hydroxide, as illustrated by Equation 11:

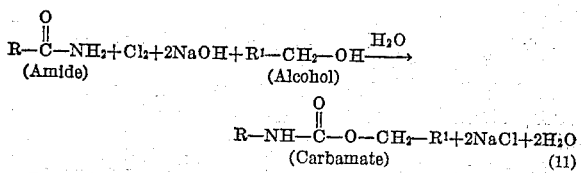
(11)

In order to minimize the effect of the side reactions, the literature recommends a reaction temperature not exceeding ten (10) degrees centigrade. Even under these conditions, whether the reaction is performed in an aqueous media (as taught) or in an anhydrous media, the yields of carbamates are well recognized to be low. In addition to the side reactions previously discussed, still additional side reactions come into play with the result that quite often the major products are found to be ureas of a variety of types, rather than the desired carbamate. It follows that any savings in cost that can be realized by using caustic in place of alkoxides are more than offset by the lower yields which are obtained and by the need for affecting the reaction under refrigeration conditions. A further disadvantage of using an alkali metal hydroxide is that the effective halogenating agent is sodium (or potassium) hypohalite which requires a very dilute solution and hence presents problems in the processing of very large volumes of materials to obtain a small amount of desired product.

Thus, it is apparent that, using either of the general procedures described in the literature, the conversion of amides to carbamates was bound to remain only of academic interest. Evidence of this is seen in the fact that most carbamates which are presently of commercial value are being prepared by more economical reactions which do not involve the use of an amide.

THE PRESENT INVENTION

The objects of this invention are accomplished by our discovery that strong alkalies such as caustic and metallic alkoxides are not necessary to promote the conversion of amides to carbamates. We have discovered further that relatively weaker bases are very effective in promoting the desired reaction, and yet do not also promote the undesirable side reactions to the extent that the stronger bases used by the prior workers have done. The weak bases, which we have found to have these properties are the alkali metal and alkaline earth carbonates, $(CO_3^=)$; bicarbonates, $(HCO_3^-)$; borates, $(HB_2O_4^-)$ and $(B_2O_4^=)$; phosphates, $(PO_4^{\equiv})$; monohydrogen phosphates $(HPO_4^=)$; hydrogen phosphites, $(HPO_3^-)$; hydrogen arsenates, $(HA_5O_3^=)$; cyanides, $(CN^-)$; silicates; cyanurates, etc. and also the alkaline earth hydroxides, oxides and alkoxides. The ionization constants of the acids of these anions are greater than $1 \times 10^{-12}$ except the hydroxides and oxides. Specifically excluded from these weak bases are the strong bases, that is, the alkali metal oxides, hydroxides, alkoxides, etc. Alkali metal cations to be included within the scope of this invention are: Lithium $(Li^+)$, Sodium $(Na^+)$, Potassium $(K^+)$, Rubidium $(Rb^+)$, and Cesium $(Cs^+)$. Those cations which for the purposes of this invention are to be considered as alkaline earth cations are: Magnesium $(Mg^{++})$, Calcium $(Ca^{++})$, Zinc $(Zn^{++})$, Barium $(Ba^{++})$, and Aluminum $(Al^{+++})$. The weak bases to be used in the process of this invention are therefore materials such as sodium carbonate, potassium carbonate, sodium bicarbonate, sodium borate, calcium oxide, calcium hydroxide, barium hydroxide, and mixtures thereof. And of these weak bases, we prefer to use sodium carbonate (ordinary commercial soda ash) mainly for the reason that it is the cheapest material of those from which to select. The reaction using soda ash is illustrated by Equation 12:

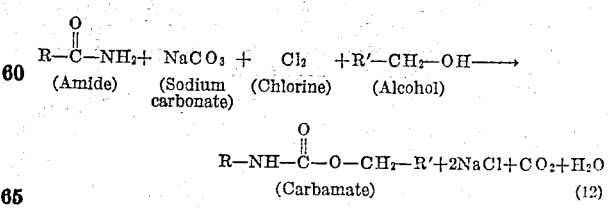
(12)

Amides to be embraced within the scope of this invention are the primary organic amides which undergo rearrangement to a carbamate. Included among these chemicals are: aliphatic acyclic amides, such as acetamide, propionamide, butyramide, valeramide, caproamide, enanthamide, caprylamide, lauramide, oleamide, palmitamide, stearamide, malonamide, adipamide, acrylamide, urea, methylurea, ethyl urea, and the like; aliphatic cyclic amides, such as cyclohexanecarboxamide, cyclopentanecarboxamide, furfuralcarboxamide, tetrahydrofurfuralcarboxamide, cyclohexanedicarboxamide, maleic imide, succinimide, bicyclo-(2,2,1) - 5 - heptene - 2,3 - dicarboximide, hexahalobicyclo - (2,2,1) - 5 - heptene 2,3 - dicarboximides such as 1,4,5,6,7,7 - hexachlorobicyclo- (2,2,1) - 5 - heptene - 2,3 - dicarboximide, and the like; aromatic amides, such as benzamide, naphthamide, phenylbenzamide, phthalimide, quinolinecarboxamide, phenylacetamide, phenylpropionamide, terephthalamide, isophthalamide, nicotinamide, picolinamide, salicamide, and the like; substituted amides, such as chloroacetamide; o, m, and p-chlorobenzamide; o, m, and p-nitrobenzamide; o, m, and p-methoxybenzamide; isomers of dichlorobenzamide; isomers of dinitrobenzamide; isomers of demethoxybenzamide; o, m, and p-methylbenzamide; dichloroacetamide, trichloroacrylamide and the like. Substituted amides are found in general to be more suitable for this rearrangement reaction, for the substituents tend to inactivate that part of the molecule to which the carboxamide group is attached. Among the substituent groups which we contemplate using are fluoro, chloro, bromo, methyl, methoxy, trifluoromethyl, nitro, amino, chloromethyl, dichloromethyl, trichloromethyl, ethyl, ethoxy, etc. The N-chloro organic amides also are to be included within the scope of the definition of the term "amides" for we have found that the N-chloro derivative of the particular organic amide to be reacted may be advantageously useful in affecting the conversion of this invention. In some cases the N-dichloro organic amides may also be useful in our process.

Thus in general, this invention is not restricted to the nature of the amide.

The halogenating agent may be gaseous chlorine, bromine and mixtures thereof, with chlorine being preferred because of economic considerations.

Preferred alcohols to be embraced within the scope of this invention can be defined as

wherein R' is selected from the group consisting of hydrogen, nitrogen, and organic radicals. Among the alcohols which are embraced within the preferred scope of this invention are aliphatic acyclic alcohols, such as methanol, ethanol, propanol, butanol, pentanol, hexanol, heptanol, allyl alcohol, methallyl alcohol, crotyl alcohol, octanol, nonanol, decanol, undecyl alcohol, dodecyl alcolhol, tetradecyl alcohol, cetyl alcohol, octadecyl alcohol, ethyl hexanol and the like; aliphatic cyclic alcohols, such as cyclohexanol, cyclobutylcarbinol, cyclopentanol, furfuryl alcocol, tetrahydrofurfuryl alcohol and the like; aromatic alcohols, such as benzyl alcohol, biphenyl carbinol, methylphenyl carbinol, phenyl ethyl alcohol, and the like; substituted alcohols such as chloropropanol, alcohols of the general formula HO—CH$_2$CH$_2$—X where "X" may be thiocyano, chloro, bromo, lower alkyl, cyano, carboxy, etc., ethoxy ethyl alcohol, butoxy ethanol, ethylenechlorohydrin, 2-chloropropanol, 2-bromoethanol, dichloropropanol, and the like. Among the substituent groups which we contemplate using on any of the alcohols to be used in affecting the process of this invention are carboxy, fluoro, bromo, methyl, methoxy, ethyl, ethoxy, trifluoromethyl, nitro, chloro chloromethyl, dichloromethyl, trichloromethyl, and the like. Also to be included among the preferred alcohols of this invention are polyhydric alcohols, such as, ethylene glycol, propylene glycol, butylene glycol, 1,2-propanediol, glycol, polyethylene glycols, substituted derivatives thereof, and the like. In these cases the ester (carbamate) produced may contain no hydroxy groups or may be a hydroxy ester. When unsaturated aliphatic alcohols are employed, some reaction between the halogen and the unsaturated alcohol takes place. Therefore, we prefer to employ saturated alcohols or substituted unsaturated alcohols where the substituent tends to inactivate the unsaturated group to further halogenation under the reaction conditions utilized in affecting the process of this invention.

Under certain conditions secondary alcohols can also be embraced within the scope of this invention. Such secondary alcohols are isopropanol, sec.-butanol, sec.-amyl alcohol, sec.-hexyl alcohol, sec.-octyl alcohol, sec.-nonyl alcohol, and the like.

The product, carbamates, to be included within the scope of this invention are the compounds having the general formula

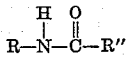

where R is an organic radical attached directly to the nitrogen atom by a carbon atom in the organic radical, and R" is an organic radical attached directly to the carbon atom selected from the group consisting of oxygen and nitrogen. Thus, for the purpose of this invention urea-type compounds are to be included within the scope of the definition of the broad term "carbamate."

CONDITIONS OF REACTION

The method of this invention comprises introducing the halogen into a mixture of about one molecular part of amide and about two or more basic equivalents of the weakly basic reagent in an alcoholic suspension or solution. For attainment of highest conversions, at least one molecular part of halogen is employed per molecular part of amide. Smaller quantities of halogen can be used, but only partial conversion of the amide to the carbamate occurs under these conditions, thus necessitating recycling operations. When one molecular part of chlorine is employed, the reaction is expressed as in Equation 12. When using an aromatic amide, such as benzamide or chlorobenzamides, it is often desirable to introduce two or more molecular parts of halogen in order to obtain a carbamate containing at least one chlorine atom in addition to the total of the chlorine atoms initially present in the amide and the alcohol. For example, the excellent herbicide betachloroethyl chlorophenyl carbamate is readily obtained as illustrated by Equation 13.

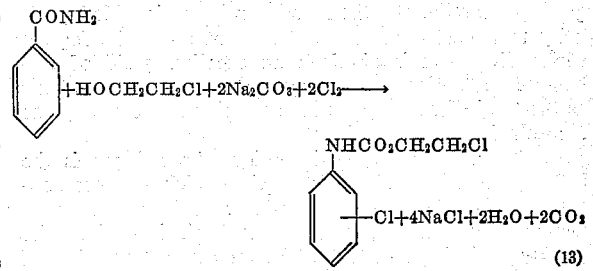

Similarly, when metachlorobenzamide is employed instead of benzamide, there is obtained betachloroethyl N-dichlorophenyl carbamate, also an excellent herbicide. It follows that the quantity of halogen employed is not a limiting part of the invention, and may be used in varying quantities depending upon the extent of halogen content of carbamate which is desired.

The quantity of weakly basic reagent to be used is preferably at least two equivalents per each molecular part of chlorine which is employed. An amount of basic reagent in excess of these requirements, e.g. slightly greater than two equivalents per mole of halogen, is often desirable in order to obtain maximum conversions. As much as twelve equivalents of basic reagent per mole of halogen have been used without appreciably effecting the yield, however such practice is not preferred because of economical considerations.

The weakly basic ingredient may be anhydrous or may contain considerable quantities of water. For example, high yields of carbamates have been obtained using soda ash which contains as much as 17 percent water. However, since soda ash is produced commercially in 99.5 percent purity, substantially anhydrous soda ash is favored for use.

The temperature conditions for the conversion of amides to carbamates may be varied considerably when using a weaker base, as defined, for promoting the reaction. The halogen has been introduced in the reaction mixture to affect the conversion at temperatures varying from zero degrees centigrade to 125 degrees centigrade. When the halogen is introduced at temperatures below 40 degrees centigrade, it is necessary that during the latter part of the reaction heat be applied at least to 40 degrees centigrade, and preferably to 50 to 70 degrees centigrade in order to affect the reaction substantially to completion. Temperatures of 100 to 125 degrees centigrade are higher than usually required, although good yields may be obtained under these conditions. When using a chlorinated alcohol, such as ethylene chlorohydrin or dichloropropanol, temperatures of 100 to 125 degrees centigrade cause appreciable side-reaction of the weakly basic ingredient with the alcohol. This undesirable feature is avoided by operating at temperatures preferably not exceeding about 70 degrees centigrade. As a general rule, maximum operating temperatures of about 80 degrees centigrade are preferred, the halogen being introduced below this temperature and above 40 degrees centigrade. When the halogen is introduced at temperatures below about 40 degrees centigrade followed by application of heat to 50 to 80 degrees centigrade, a decrease in yield of carbamate is usually obtained, however, this method of operation is sometimes required to secure the desired carbamate. For example, when ethylene chlorohydrin is used as the alcohol, the temperature conditions are important in determining the type of carbamate which is obtained. By operating at temperatures at between 50 and 125 degrees centigrade, even when only one mole of halogen is used per mole of amide, there is obtained considerable unreacted amide and the product unexpectedly is found to contain one chlorine atom in addition to the total of the chlorine atoms in the amide and the ethylene chlorohydrin. However, if the halogen is introduced at temperatures below about 30 degrees centigrade, preferably at zero to 10 degrees centigrade, and the reaction mixture is added gradually to a heated zone maintained at 60 to 80 degrees centigrade, there is obtained an excellent yield of carbamate containing the same number of chlorine atoms as the total of such atoms in the amide and the ethylene chlorohydrin.

In the practice of this invention, the halogen is the last ingredient added in any order which is most convenient. For example, the amide may be added to an alcoholic suspension of the weakly basic ingredient, the weakly basic ingredient may be added to a solution of the amide in alcohol, or the alcohol may be added to a mixture of the weakly basic ingredient and amide. When using a chlorinated alcohol, it is preferable to combine the amide and alcohol, heat or cool to the desired reaction temperature, then add the weakly basic ingredient and finally add the halogen. This procedure is preferred in the case of the use of chlorinated alcohols, since the weakly basic reagent has less opportunity to react with the chlorinated alcohol.

Upon conclusion of addition of the halogen, the reaction mixture may be processed by a variety of procedures which are not critical to the invention. The entire reaction mixture has been added to water, which dissolves the inorganic material, dilutes the alcohol, and precipitates the carbamate. Another method involves evaporation of the alcohol, both with and without the addition of a hydrocarbon to affect azeotropic distillation. When a hydrocarbon, such as benzene, toluene, xylene, and chlorobenzene are employed, an excess of such material is used so that upon complete removal of the alcohol, the mixture consists of a suspension of inorganic material in a hydrocarbon containing the carbamate in solution. The carbamate is readily recovered by filtration and crystallization, by washing out the inorganic material with water followed by crystallization of the organic layer, or simply by water washing to leave the carbamate in a hydrocarbon solution suitable for use as such. None of these operational procedures are critical to the practice of the invention.

The formation of methyl-m-chlorophenyl carbamate occurs in two distinct energy levels. The first step or energy level involves the chlorination of metachlorobenzamide to the compound N-chloro-m-chlorobenzamide which is believed to be a new composition of matter.

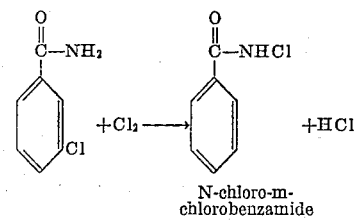

N-chloro-m-chlorobenzamide (14)

This reaction takes place in methanol very rapidly with no detectable chlorine escaping during the exothermic reaction when it is affected at temperatures between 12 and 20 degrees centigrade. Thus during the rearrangement this compound is formed in situ. A high yield of this compound was obtained by affecting the reaction in a solvent of carbon tetrachloride.

When using greater amounts of chlorine at temperatures between 12 and 20 degrees centigrade the N-chloro-m-chlorobenzamide further chlorinates to N-dichloro-m-chlorobenzamide which is also believed to be a new composition of matter.

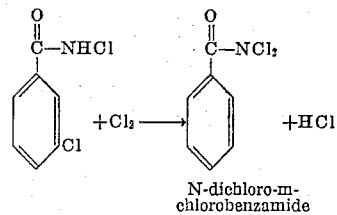

N-dichloro-m-chlorobenzamide (15)

In the alcoholic solution this compound is extremely unstable, evolving chlorine and nitrogen at even minus 60 degrees centigrade, and the strong hypochlorite odor given off by the solution gave way to the very sweet odor of a benzoate.

The second step or energy level in the formation of methyl-m-chloro phenyl carbamate involves the combined dehydrochlorination and rearrangement of the N-chloro-m-chloro benzamide.

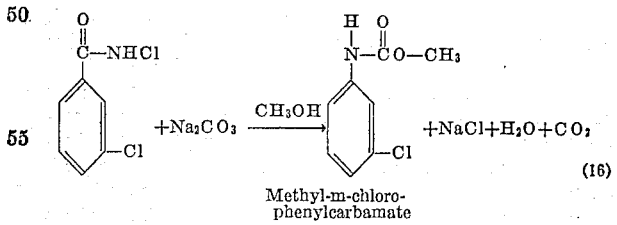

Methyl-m-chlorophenylcarbamate (16)

These reactions, as combined into one overall equation above (12) occur very rapidly at temperatures above 40 degrees centigrade, and the yields are very high.

When the reaction mixture containing N-chloro-m-chloro benzamide is heated to 30 degrees centigrade, a by-product N-m-chlorophenyl-N-m-chloro benzoyl urea was recovered which is believed to be formed by the following general equation:

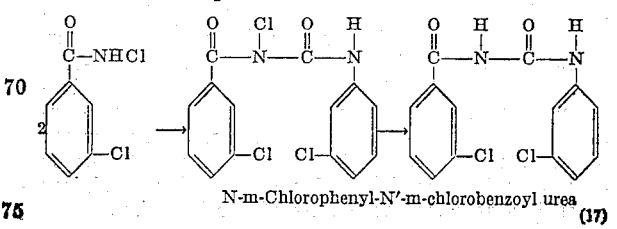

N-m-Chlorophenyl-N'-m-chlorobenzoyl urea (17)

This compound was also isolated and is believed to be a new composition of matter. Its melting point is 212–213 degrees centigrade and its analysis was calculated: chlorine 23.0 percent; nitrogen 9.06 percent; found: chlorine 23.0 percent; nitrogen 8.95 percent. It is odorless and practically unsoluble in the common organic solvents and only has a solubility of 0.3 percent in boiling acetone. It formed a soluble sodium salt in methanol which was precipitated unchanged (melting point and mixed melting point) upon addition of HCl. The compound believed to be the intermediate structure is a very unstable oil at 30 deegrees centigrade, giving a strong odor of hypochlorite-type compounds and was very soluble in methanol.

It is most interesting to us that when this by-product was not isolated from the reaction mixture and the mixture subsequently heated to above 40 degrees centigrade (e.g. 65 degrees centigrade), substantially no trace of this easily recoverable compound was obtained. We conclude, therefore, that due to the high theoretical yield of methyl-m-chlorophenyl carbamate, the N-chloro compound (believed to be the intermediate derivative in the above equation), reacted with methanol at these elevated temperatures to undergo cleavage and form the desired methyl-m-chlorophenyl carbamate.

The carbamates of this invention are potent herbicides. For example, betachloroethyl N-phenyl carbamate, betachloroethyl, N-chlorophenyl carbamate, betachloroethyl N-dichloro-phenyl carbamate, methly N-chlorophenyl carbamate, and glycol N-chlorophenyl carbamates show high degrees of selectivity in both pre-emergence and post emergence application to field crops and weeds.

It is of particular importance that the process of this invention may also be useful in the production of di- and tri functional carbamates which are starting materials for making poly urethan polymers. This reaction is illustrated below:

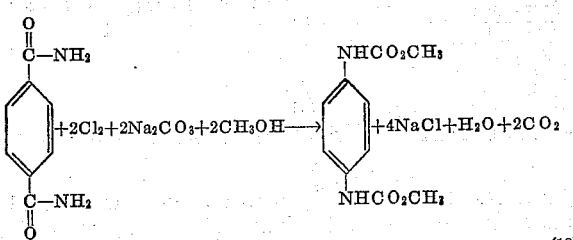

(18)

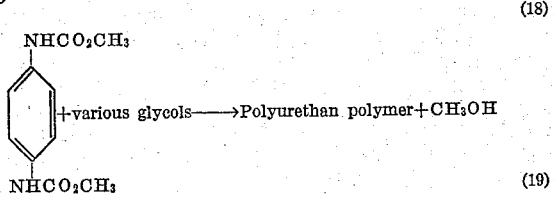

(19)

Other polyamide starting materials may also be used, such as p-diacetamide benzene, adipamide, isophthalic-diamide, and the like. Also imides, such as phthalimide, maleic imide, isophthalimide, the imide of a hexahalo bicyclo (2,2,1) heptene-2,3-dicarboximide such as 4,5,6,7,8,8-hexachloro bicyclo (2,2,1) heptene-2,3-dicarboximide, and the like.

Thus, the urethans produced by the process of this invention might be applied to alkyds, polyesters, and in general any polymer field which involves the use of di or tri carboxylic acids, anhydrides, acid chlorides, amides, imides or other derivatives of dicarboxylic acids. For example the methyl urethan of maleic acid produced by the reaction of maleic diamide with methanol in the presence of a halogenating agent and a weak base in accordance with our invention may be effective in the same or similar uses for which maleic anhydride and maleic acid are now being used. Further, copolymers of urethans or diurethans with maleic acid or anhydride may also have distinct advantages over other type polymers. The potentialities of economical methods for preparing diurethans and polyurethans will be readily recognized by one skilled in the art of polymer production. Already certain of the polymers have been useful as fibers for bristles, ladies hosiery, protective clothing, lacquers, fast drying oils, molding compounds, plastic foam, and adhesives.

The following examples are given to illustrate the general methods for making representative compounds of this invention, but we do not wish to be specifically limited thereto except as defined in the appended claims.

*Example 1*

REARRANGEMENT OF 3-CHLOROBENZAMIDE USING SODIUM METHOXIDE AS THE BASIC INGREDIENT

*Part A.*—By following the generalized procedure as outlined in Organic Reactions, volume III an attempt was made to convert 3-chlorobenzamide to methyl 3-chlorophenyl carbamate. Utilizing chlorine as the halogen, 2.0 moles of sodium were dissolved in 2 litres of dry methanol to form a solution of sodium methylate. 155.5 grams (1.0 mole) of 3-chlorobenzamide was dissolved in the methylate solution at room temperature, whereupon 71 grams (1.0 mole) of gaseous chlorine was introduced into the agitated solution during a period of 20 minutes at 10–15 degrees centigrade. After the chlorine addition, the creamy-milky reaction mixture was heated to the boiling point (64 degrees centigrade) during a period of 10 minutes, and maintained at the boiling point for 3 minutes. At this time, the reaction mixture was neutral showing complete consumption of sodium methylate. The mixture was evaporated to one-third the original volume, cooled, and filtered to remove the suspended solid, which was found to be essentially sodium chloride. The methanol in the filtrate was removed by evaporation and replaced by benzene. Crystallization from benzene gave 65 grams of recovered 3-chlorobenzamide (identified by mixed melting point, M.P. 135° C.). The resulting filtrate was distilled 8 mm. to give 23 grams of a crude fraction boiling at 128 to 155 degrees centigrade and containing 23.1 percent chlorine, 43 grams of a material boiling at 155 to 180 degrees centigrade and containing 36.5 percent chlorine (theory for N-chloro-3-chlorobenzamide is 37.2 percent chlorine), and 10.5 grams of higher boiling material. No methyl 3-chlorophenyl carbamate (M.P. 83–84° C., 19.1 percent chlorine) was obtained, although it is conceivable that the liquid fraction of boiling range 128 to 155 degrees centigrade at 8 mm. might contain a small percentage of this material, possibly great enough to correspond to a conversion of say 5 percent.

*Part B.*—By performing the reaction similarly as described in Part A, except using twice the quantity of sodium methylate, 3-chlorobenzamide was recovered and a 60 percent conversion to methyl 3-chlorophenyl carbamate. The carbamate was readily separated from unchanged amide due to the much greater solubility of the former in benzene at room temperature.

*Part C.*—By performing the reaction similarly as described in Part A, except by introducing the chlorine at the boiling point of the mixture (64° C.), there was obtained recovered amide and a sixty-five percent conversion to methyl 3-chlorophenyl carbamate.

*Example 2*

THE SYSTEM: 4-CHLOROBENZAMIDE, SODIUM METHYLATE, CHLORINE, METHANOL 155.5 grams (1.0 mole) of 4-chlorobenzamide was added to a solution of 46 grams (2.0 moles) in 2 litres of dry methanol. 79 grams (1.1 moles) of chlorine gas was introduced into the agitated solution during a period of 50 minutes at 10 to 17 degrees centigrade. After the chlorine addition, the mixture was heated to the boiling point (65° C.) during a period of 25 minutes.

The cooled mixture was diluted with 7 litres of water and filtered. After a thorough washing with water and drying, the white solid product weighed 147 grams and had a melting range of 186 to 188.6 degrees centigrade. Recrystallization from methanol gave pure N-chloro-4-chlorobenzamide (M.P. 189.2 to 190.4° C.; percent total chlorine: calculated: 7.37; found: 7.32).

*Example 3*

THE SYSTEM: 3 CHLOROBENZAMIDE, SODIUM ISO-PROPYLATE, CHLORINE, ISOPROPANOL 155.5 grams (1.0 mole) of 3-chlorobenzamide was added to a solution of 46 grams (2.0 moles) sodium in 2 litres (0.04 percent water) of anhydrous isopropanol. Chlorine gas (71 grams, 1.0 mole) was introduced into the agitated mixture during a period of 50 minutes as the temperature increased from 33 to 70 degrees centigrade. The slightly acidic mixture was evaporated to dryness on the steam bath, and the resulting pasty mass was agitated at room temperature with 3 litres of water. Carbon tetrachloride (3 litres) was then added and the mixture vigorously agitated. Filtration and drying gave 27 grams of N-(3-chlorophenyl)-N-(3-chlorobenzoyl) urea. The carbon tetrachloride layer from the filtrate was evaporated on the steam bath and the residue was distilled at 7 mm. Hg to give 95 grams of material boiling essentially from 161 to 170 degrees centigrade and 22 grams of material boiling from 170 to 200 degrees centigrade.

The material boiling at 161 to 170 degrees centigrade analyzed 20.2 percent chlorine, 6.8 percent nitrogen. Recrystallization of the 161 to 170 degree centigrade fraction from hexane gave 43 grams containing 19.4 percent chlorine. Another crystallization gave 21 grams containing 18.2 percent chlorine. The theoretical weight for isopropyl 3-chlorophenyl carbamate would be 213 grams and 16.6 percent chlorine content.

*Example 4*

USE OF SODA ASH IN REARRANGEMENT OF 3-CHLOROBENZAMIDE 3-chlorobenzamide (155.5 grams, 1.0 mole) was added to a suspension of commercial soda ash (2.0 moles) in commercial methanol (2 litres). Chlorine gas (85 grams, 1.2 moles) was introduced into the agitated mixture at 64 to 66 degrees centigrade during a period of one hour. After the chlorine addition, methanol (1800 ml.) was distilled from the mixture at atmospheric pressure. The resulting slurry was poured into water (2 litres), agitated, filtered, and the precipitate was washed with water and dried. The tan colored product was obtained in theoretical weight (185 grams) and had a last crystal point of 8.8 degrees centigrade, corresponding to 96.0 mole percent purity of methyl-3-chlorophenyl carbamate. One recrystallization from a mixture of benzene and hexane gave 177 grams of product having an ordinary capillary melting point of 83.2 to 83.9 degrees centigrade and an accurate last crystal point of 83.7 degrees centigrade corresponding to 99.7 mole percent purity; yield of substantially 100 percent quality product was therefore 95 percent of the theoretical. Recovery of the inorganic material was 99-100 percent of of theory, and consisted mainly of soda ash and sodium chloride with only a few percent of sodium bicarbonate, which reverts to soda ash under the conditions specified for conducting the reaction.

*Example 5*

USE OF VARIOUS COMPOUNDS IN REARRANGEMENT OF 3-CHLOROBENZAMIDE

*Part A. Potassium carbonate.*—Chlorine gas (1.2 moles) was introduced into an agitated mixture of potassium carbonate (1.5 moles), 3-chlorobenzamide (1.0 mole), and methanol (1.0 litre) at 64 to 67 degrees centigrade. Upon completion of the chlorine addition, about 70 percent of the methanol was distilled at atmospheric pressure and then the remainder of the methanol was removed by azeotropic distillation with benzene. The boiling benzene mixture was filtered and the insoluble inorganic salts were washed with hot benzene. The filtrate was concentrated on the steam bath till boiling ceased and then 212 grams of hexane was added. Crystallization from the benezenehexane solution gave 149 grams of methyl 3-chlorophenyl carbamate (80.4 percent yield).

*Part B.*—The reaction conditions reported in Part A were duplicated except that the following compounds, sodium bicarbonate, sodium borate, calcium oxide, calcium hydroxide and barium hydroxide were used instead of the potassium carbonate. The results of using these compounds are tabulated in table

TABLE

| Example No. | Compound Used | | Product-Methyl-3-Chlorophenyl Carbamate | | |
|---|---|---|---|---|---|
| | Name | Moles | Yield, Grams | Yield, percent | M. P. Range, ° C. |
| 4 | commercial soda ash | 1.0 | 177 | 95 | 83.7 |
| 5A | potassium carbonate | 1.5 | 149 | 80.4 | |
| 5B | sodium bicarbonate | 4.0 | 165 | 89 | 82–83 |
| 5C | sodium borate | 2.0 | 126 | 67.5 | 82.3–83.7 |
| 5D | calcium oxide | 1.5 | 167 | 90 | 83.9–84.6 |
| 5E | {Calcium oxide | 1.0 | | 78 | 81–83 |
| | {Na$_2$CO$_3$ | 1.0 | | | |
| 5F | Calcium hydroxide | 2 | 158 | 86 | 82.0–83.4 |
| 5G | barium oxide | 2 | 135 | 73 | 78–81 |

*Example 6*

EFFECT OF TEMPERATURE ON REARRANGEMENT OF AMIDES

*Part A.*—Chlorine (71 grams, 1.0 mole) was passed into a methanol (2 litre) solution of 3-chlorobenzamide (155.5 grams, 1.0 mole) containing soda ash (2.0 moles) at 12 to 20 degrees centigrade. The cold reaction mixture was distilled at reduced pressure to remove most of the methanol. Dilution of the residue with water resulted in a disappearance of the odor typical of N-chloro amides and produced a white precipitate, which was shown to be 3-chlorobenzamide of high purity. Methyl 3-chlorophenyl carbamate was not recovered and only a few percent of methyl 3-chlorobenzoate.

*Part B.*—This experiment was performed similarly as in Part A, with the exception that heat was applied to 65 degrees centigrade upon completion of the addition of chlorine.

*Part C.*—This experiment was performed similarly as in Part A, with the exception that 2.0 moles of chlorine were introduced into the reaction mixture.

*Part D.*—This experiment was performed similarly as in Part A, with the exception that 106 grams (1.5 moles) of chlorine were introduced at 12–20 degrees centigrade followed by gentle warming to 30 degrees centigrade.

*Part E.*—This experiment was performed similarly as in Part B, with the exception that 106 grams (1.5 moles) of chlorine were introduced.

*Part F.*—This experiment was performed similarly as in Part E, with the exception that the quantity of chlorine was decreased to 94 grams (1.3 moles).

The results of the above experiments are tabulated in table

TABLE

*Effect of temperature on rearrangement of amides*

| Example No. | Temp. Range, °C. | Amount of Cl Moles | Product | Yield, percent |
|---|---|---|---|---|
| 4 | 64-66 | 1.2 | methyl 3-chlorophenylcarbamate. | 95 |
| 6A | 12-20 | 1.0 | {3-chlorobenzamide. <br> methyl 3-chlorophenylcarbamate. | <br> 69 |
| 6B | 65 | 1.0 | {methyl 3-chlorophenylcarbamate. <br> methyl 3-chlorobenzoate. |  |
| 6C | 12-20 | 2.0 | methyl 3-chlorobenzoate. | 96 |
| 6D | 12-20, warm to 30. | 1.5 | {N-3-chlorophenyl-N'-3-chloro-benzoylurea. <br> methyl 3-chlorobenzoate. | 28 |
| 6E | 65 | 1.5 | {methyl 3-chlorophenylcarbamate. <br> methyl 3-chlorobenzoate. | 23 <br> 65 |
| 6F | 65 | 1.3 | {methyl 3-chlorophenylcarbamate. <br> methyl 3-chlorobenzoate. | 31 |
| 6G | 78, 10 p.s.i. | 2.0 | methyl 3-chlorophenylcarbamate. | 83.4 |

Example 7

USE OF ETHYLENE CHLOROHYDRIN

*Part A.*—Chlorine (71 grams, 1.0 moles) was passed into an ethylene chlorohydrin (2 litres) solution of 3-chlorobenzamide (155.5 grams, 1.0 mole) containing soda ash (5.0 moles) at 10 to 15 degrees centigrade. The reaction mixture was then warmed during a period of 0.5 hours to 70 degrees centigrade and maintained at that temperature for 0.5 hour. The mixture was cooled and filtered to give a white solid mixture. The solid was washed exhaustively with water and the water-insoluble solid was dried. It was found to be N-3-chlorophenyl N'-3-chlorobenzoyl urea; yield, 73 percent.

*Part B.*—Chlorine (85 grams, 1.2 moles) was passed into an ethylene chlorohydrin (2 litres) solution of 3-chlorobenzamide (155.5 grams, 1.0 mole) containing soda ash (5.0 moles) at 65 to 70 degrees centigrade. The cooled reaction mixture was filtered to remove inorganic material and distilled at reduced pressure to remove most of the ethylene chlorohydrin. The remainder of the ethylene chlorohydrin was displaced by distillation with xylene. The cooled xylene solution was filtered and the solid found to contain only a trace of inorganic material and a 46 percent recovery of unchanged 3-chlorobenzamide. The xylene filtrate was distilled to a pot temperature of 150 degrees centigrade at 5 mm. The organic residue (yield based on recovered amide, 92%) analyzed for a mixture of 2-chloroethyl N-3, X-dichlorophenyl carbamate.

Found—percent Cl, 36.4; percent N, 5.6; active chlorine (1 hour reflux with alcoholic caustic), 11.6%. Calcd.—percent Cl, 30.4; percent N, 6.0 for 2-chloroethyl N-3-chlorophenyl carbamate percent Cl, 39.6; percent N, 5.2 for 2-chloroethyl N-3, X-dichlorophenyl carbamate.

*Part C.*—This experiment was initially as in Part A, however, after the additions the cold mixture was then added dropwise to 500 ml. ethylene chlorohydrin maintained at 65 to 70 degrees centigrade. The product was worked up and found to contain a 23 percent yield of N-3-chlorophenyl N'-3-chlorobenzoyl urea and 74 percent of 2-chloroethyl-N-3-chlorophenyl carbamate.

*Part D.*—Chlorine (106 grams, 1.5 mole) was passed into an ethylene chlorohydrin (2 litres) solution of 3-chlorobenzamide (155.5 grams, 1.0 mole) containing soda ash (5 moles) at 115–120 degrees centigrade. The product was found to contain unreacted 3-chlorobenzamide and 2-chloroethyl N-3-chlorophenyl carbamate (133 grams; percent Cl, 30.2; percent N, 6.1).

Example 8

EFFECT OF QUANTITY OF CHLORINE

*Part A.*—Experiments were performed similarly as in Example 4, with variations in the quantity of chlorine which was passed into the mixture. Using the theoretical quantity of chlorine (1 mole), and a 10, 20, 30, 50 and 100 percent excess of the theoretical quantity, the yields of pure methyl 3-chlorophenyl carbamate which were obtained were 86, 93.9, 95.4, 93.5, 83.0 and 69 percent, respectively. Only in the case of the use of the theoretical quantity of chlorine was there a significant quantity of unreacted 3-chlorobenzamide. The decrease in yield of methyl 3-chlorophenyl carbamate with the use of 50 and 100 percent excess of chlorine was accompanied by an increase in the yield of more highly chlorinated carbamates.

*Part B.*—Experiments were performed similarly as in Example 7, Part B, with variations in the quantity of chlorine which was passed into the mixture. Using 20 percent excess (1.2 moles) of the theoretical quantity of chlorine to form 2-chloroethyl N-3-chlorophenyl carbamate, there was obtained a 59 percent recovery of unreacted 3-chlorobenzamide and a product containing a large percentage of 2-chloroethyl N-3, X-dichlorophenyl carbamate. By increasing the quantity of chlorine progressively from 1.4, 1.6, 1.8, 2.0 to 2.2 moles, there were obtained recoveries of 3-chlorobenzamide of 26, 19, 10, 3, and zero percent, respectively. The quantity of 2-chloroethyl N-3, X-dichlorophenyl carbamate increased as the quantity of chlorine was increased and was obtained in 84 percent conversion using 2.2 moles of chlorine per mole of 3-chlorobenzamide.

Calcd.: for 2-chloroethyl N-3, X-dichlorophenyl carbamate percent Cl, 39.6; percent N, 5.2. Found: percent Cl, 38.9; percent N, 5.2.

Hydrolysis of the product with alcoholic caustic gave the N-3, X-dichlorophenyl oxazolidone, M.P. 79° C.

*Part C.*—Results similar to those obtained in part B were observed when the 3-chlorobenzamide was replaced by benzamide. For example, when 1.2 moles of chlorine were introduced into the reaction mixture, there was obtained a 48 percent recovery of unreacted benzamide and an 88 percent yield of essentially 2-chloroethyl N-x-chlorophenyl carbamate. Using 2.2 moles of chlorine, there was obtained no benzamide and an 89 percent yield of 2-chloroethyl N-X-chlorophenyl carbamate.

Calcd.: percent Cl, 30.4; percent active Cl, 15.2. Found: percent Cl, 30.9; percent active Cl, 14.9.

As the quantity of chlorine is increased to 3.2 moles per mole of benzamide, the product approaches the analysis for 2-chloroethyl N-X, Y-dichlorophenyl carbamate, the total chlorine content increasing to 37.0 percent and the active chlorine content decreasing to 13.3 percent.

The rate of passage of the chlorine has been varied from 9 minutes to 3 hours with little or no effect on the yield of carbamate. Similarly, the use of nitrogen as a diluent for the chlorine did not have a significant effect on the yield.

Example 9

SOLVENTS FOR REARRANGEMENT REACTIONS

*Part A.*—It is the usual practice of this invention to use an excess of the alcohol which is a reactant to provide a fluid medium which is readily agitated. In the preparation of certain carbamates, the quantity of alcohol employed is usually well in excess of that necessary for efficient agitation in order to obtain maximum yields of desired carbamates. For example, using 1.2 moles chlorine per 1.0 mole 3-chlorobenzamide, 2.0 moles soda ash, and varying the weight ratio of methanol to amide from 15.3 to 10.2 to 5.1, there was obtained yields of pure methyl 3-chlorophenyl carbamate of 95.0%, 95.9% and 86.1% respectively.

*Part B.*—The solubility of the soda ash in the reaction medium can be increased by adding water to the reaction mixture or by using hydrated soda ash. For example, by performing the rearrangement similarly to Example 4, using hydrated soda ash (16% water) instead of anhydrous soda ash, there was obtained a 91.8% conversion to methyl 3-chlorophenyl carbamate.

*Part C.*—In certain cases, the large excess alcohol employed in the rearrangement reaction presents recovery difficulties. In order to overcome this objectionable feature, both carbon tetrachloride and monochlorobenzene have served well to replace as much as 75% of the quantity of alcohol without markedly effecting the yields. For example, by introducing 2.2 moles chlorine into a mixture comprising soda ash (3.3 moles), benzamide (1 mole), ethylenechlorohydrin (500 ml.), and carbon tetrachloride (1500 ml.), the product analyzed 34.6% chlorine and 13.0% active chlorine, thus corresponding well for 2-chloroethyl chlorophenyl carbamates.

*Part D.*—A solution of chlorine (85.2 grams) in carbon tetrachloride (520 ml.) was added dropwise to a suspension of soda ash (212 grams) and 3-chlorobenzamide (155.5 grams) in methanol (1 litre). The addition was performed during a period of 2 hours at a pot temperature of 58–65°. The remaining methanol and carbon tetrachloride were removed by distillation and replaced by benzene before filtering to remove the inorganic materials. Evaporation of the benzene from the filtrate and crystallization of the residue from a mixture of benzene (66 grams) and hexane (212 grams) gave 144 grams of methyl 3-chlorophenyl carbamate having a melting range of 70–81° C.

Example 10
RECOVERY OF CARBAMATES FROM REACTION MIXTURE

Upon completion of the addition of the chlorine, the excess of alcohol or solvent has been recovered by distillation both at atmospheric pressures and at reduced pressures. It has often been convenient to add benzene, monochlorobenzene, toluene, and xylene to the mixture to complete the removal of the last portion of the alcohol by means of distillation. When such water-insoluble liquid ingredients are employed and after the alcohol has been recovered, water is added to form a two phase liquid-liquid system, one phase consisting of the carbamate dissolved in the water-immisable liquid ingredient and the other phase consisting of an aqueous solution of inorganic materials. The phases are separated, and that containing the carbamate has been used as such or has been crystallized from the solvent, or recovered by distillation. Instead of employing water to remove the inorganic material, it has been perfectly satisfactory to remove the inorganic material simply by filtration. In many cases, no extraneous organic solvent is employed. In these instances, the slurry obtained after distillation of the alcohol has been added to cool water to dissolve the inorganic material and precipitate the carbamate, whereupon simple separation furnishes the product. Often, warm water has been added in order to maintain a fluid state of the carbamate, which permits a liquid-liquid separation instead of a filtration in case the carbamate is a solid at ordinary temperatures. All of these variations, with and without the addition of commonly accepted methods for recovery of products, have been applied in particular to the preparation of methyl 3-chlorophenyl carbamate, methyl phenyl carbamate, and 2-chloroethyl 3-chlorophenyl carbamate. The yields have been constant within about 9%, and a substantial portion of this variance may have been within experimental errors.

Example 11
QUANTITY OF SODA ASH

By performing the rearrangement of 3-chlorobenzamide to methyl 3-chlorophenyl carbamate similarly as described in Example 4, with the exception that only 1.25 moles soda ash were employed, the yield of pure product was 95.4%.

The formation of 2-chloroethyl phenyl carbamates has resulted in high yield using as much as 6 moles of soda ash and as little as 2.0 moles of soda ash. When it is desirable to obtain a product containing chlorine in excess of that contained in the amide used as the starting material, increased quantities of soda ash are desirable to obtain optimum conversions. For example, the minimum quantity of soda ash for the optimum formation of 2-chloroethyl N-3, X-dichlorophenyl carbamate is about 2.3 moles per mole of 3-chlorobenzamide.

Example 12
PREPARATION OF METHYL N-PHENYL CARBAMATE

Chlorine (106 grams, 1.3 moles), soda ash (212 grams, 2.0 moles), and methanol (2 litres) during a period of 25 minutes at 65° C. At the conclusion of the addition of chlorine, methanol (700 ml.) was removed by atmospheric distillation of the orange reaction mixture. The remainder was cooled and poured onto cold water. The resulting oil was extracted with benzene and distilled to give 152 grams of methyl N-phenyl carbamate (P.B.R. 102–107° C. at 3.5 to 4 mm. Hg). One crystallization from hexane gave the pure product (M.P. 48.2–48.8° C., 0.1% chlorine, 9.0% nitrogen).

Example 13
PREPARATION OF METHYL 2,5-DICHLOROPHENYL CARBAMATE

Chlorine (85.2 grams) was passed into an agitated mixture of 2,5-dichlorobenzamide (190 grams), soda ash (212 grams), and methanol (2 litres) during a period of 25 minutes at 64–65° C. At the conclusion of the addition of chlorine, methanol (1460 ml.) was removed by distillation, whereupon benzene (1500 ml.) was added and the distillation was continued until an additional 1350 ml. of distillate had been removed. The mixture was filtered to remove inorganic material and the inorganic precipitate was washed well with warm benzene. The benzene filtrate was evaporated to a weight of 283 grams, whereupon 315 ml. of hexane were added for mixed solvent crystallization. There was obtained 172 grams of methyl 2,5-dichlorophenyl carbamate. After recrystallization, it analyzed 32.0% chlorine, 6.29% nitrogen, and had a M.P. of 70.2–71.0° C. (theory: 32.3% chlorine, 6.36% nitrogen).

Example 14
PREPARATION OF OTHER METHYL N-PHENYL CARBAMATES 2-chloro-5-nitrobenzamide, 4-methylbenzamide, 3-methylbenzamide, 4-methoxybenzamide, 3-methoxybenzamide, 2-methoxybenzamide, and 2-chlorophenoxyacetamide were treated with chlorine, methanol, and soda ash similarly as in Example 4. In each case, the carbamate was separated from varying quantities of unreacted amide by virtue of the decreased solubility after the amide in benzene or in mixtures of benzene and hexane. Methyl 2-chloro-5-nitrophenyl carbamate (found 12.1% nitrogen; calcd. 12.15% nitrogen) and methyl 4-methylphenyl carbamate (found 8.6% nitrogen; calcd. 8.5% nitrogen) were obtained in 80–86% yields with little or no unreacted amide being present. In the preparation of methyl N-(2-chlorophenoxymethyl) carbamate, methyl 4-methoxy-phenyl carbamate, methyl 3-methoxyphenyl carbamate, methyl 2-methoxyphenyl carbamate, and methyl 3-methylphenyl carbamate, the conversions varied from 22 to 65% due to the recovery of appreciable quantities of unreacted amides.

The compounds of this invention are useful for various purposes as chemical intermediates in making herbicides, adhesives, foams, and the like. The compounds find particular application as herbicides as is more fully described hereinafter. By employing the chemical reaction depicted herein polyurethanes may be made directly from the di- and polyamids. By reacting the carbamates of this invention with a reagent such as phosphorus pentaoxide, or a phosphorus pentachloride, etc., the corresponding di-isocyanates may be prepared. Data showing the herbicidal activity of chloromethylphenyl carbamate (CMPC) and beta-chloroethyl chlorophenyl carbamate (BCECPC) as compared with chloro isopropyl phenyl carbamate (CIPC) was accumulated as follows:

The herbicidal effects of the compound to be tested were compared with the known herbicidal activities of CIPC by the following three types of testing procedures. In the leaf-dip test, single leaves of tomato plants were dipped into the sections containing one gram of the compound and one hundred milliliters of aqueous solvent. In the lanolin paste test solutions of one percent of the compound in lanolin were applied both to areas on the leaf and the stem. In the total spray test, one percent solution of the compound in aqueous solvent were used to wet the entire plant. Results obtained are shown in the following table.

TABLE 1

*The effects of certain carbamate compounds on plants when applied in various tests*

| Compound | Lanolin Paste | | | | Leaf Dip, Tomato | Total spray | | | | Total |
|---|---|---|---|---|---|---|---|---|---|---|
| | Cucumber | | Soybean | | | Cotton | Soybean | Tomato | Wheat | |
| | L. | St. | L. | St. | | | | | | |
| CIPC | | T. 1 | 0 | 1 | 4 | 4 | 4 | 4 | 3 | 22 |
| CMPC | 1 | 0 | 1 | 0 | 4 | 4 | 4 | 4 | 3 | 21 |

Key: L., Leaf; St., Stem; T., Translocation.

Degree of plant injury: Activity value
Very Severe ---- 4
Severe ---- 3
Moderate ---- 2
Slight ---- 1
None ---- 0

In another series of tests, the relative pre-emergence herbicidal activity of CMPC, BCECPC and CIPC were determined and are given in the following table:

TABLE 2

*The effect of certain carbamate compounds on plants when applied by preemergence application*

| | Lbs/Acre | Cotton | Corn | Wheat | Ryegrass |
|---|---|---|---|---|---|
| CMPC | 2 | 0 | 0 | 0 | 3 |
| CMPC | 8 | 0 | 1 | 1 | 4 |
| CMPC | 16 | 0 | 2 | 1 | 4 |
| BCECPC | 2 | 0 | 0 | 0 | 3 |
| BCECPC | 8 | 0 | 0 | 0 | 4 |
| BCECPC | 16 | 0 | 0 | 0 | 4 |
| CIPC | 2 | 0 | 2 | 2 | 4 |
| CIPC | 8 | 0 | 4 | 4 | 4 |
| CIPC | 16 | 0 | 4 | 4 | 4 |

Degree of plant injury: Activity value
Very Severe ---- 4
Severe ---- 3
Moderate ---- 2
Slight ---- 1
None ---- 0

From a consideration of the foregoing data it is apparent that each of the compounds tested are active herbicides.

Although this invention has been illustrated by citing specific details of given species embraced within the scope of the invention, it is to be understood that various modifications within the invention are possible, some of which have been referred to above; therefore, we do not wish to be limited except as defined by the appended claims.

This application is a divisional of applicants' parent application Serial Number 483,436, filed January 21, 1955, now U.S. Patent 2,860,166.

We claim:

1. A process for the production of a carbamate which comprises reacting an amide having the structure R—CONH$_2$ where R is an aryl radical, with an alcohol having the structure R'—CH$_2$OH where R' is a member selected from the group consisting of hydrogen and an aliphatic radical in the presence of a halogenating agent selected from the group consisting of chlorine, bromine and mixtures thereof, and a base selected from the group consisting of the alkali metal carbonates, bicarbonates, and borates, and alkaline earth carbonates, bicarbonates, borates, oxides and hydroxides.

2. The process of claim 1 wherein the base is sodium carbonate.

3. The process of claim 1 wherein the base is sodium bicarbonate.

4. The process of claim 1 wherein the base is potassium carbonate.

5. The process of claim 1 wherein the base is sodium borate.

6. The process of claim 1 wherein the base is calcium hydroxide.

7. The process of claim 1 wherein the amide is an aromatic.

8. The process of claim 1 wherein the amide is n-chloro amide.

9. The process of claim 8 wherein the amide is N-chloro-m-chlorobenzamide.

10. The process of claim 7 wherein the aromatic amide is a benzamide.

11. The process of claim 10 wherein the benzamide is a chlorobenzamide.

12. The process of claim 11 wherein the chlorobenzamide is m-chlorobenzamide.

13. The process of claim 1 wherein the halogenating agent is gaseous chlorine.

References Cited in the file of this patent

UNITED STATES PATENTS 2,860,166    Newcomer et al. ---- Nov. 11, 1958

OTHER REFERENCES

Elliott: J. Chem. Soc., 121, 202–9 (1922).
"Organic Reactions," III, 284 (1946).
Fieser et al.: "Organic Chemistry," p. 386 (1950), 2nd ed.

UNITED STATES PATENT OFFICE
Certificate of Correction

Patent No. 2,943,108 June 28, 1960

Jack S. Newcomer et al.

It is hereby certified that error appears in the above numbered patent requiring correction and that the said Letters Patent should read as corrected below.

Column 8, lines 11 to 18, the right-hand portion of the formula should appear as shown below instead of as in the patent:

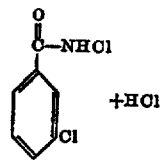

lines 32 to 39, the right-hand portion of the formula should appear as shown below instead of as in the patent:

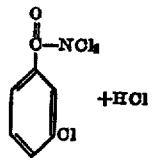

same column 8, line 64, for "N-m-chlorophenyl-N-m-chloro" read —N-m-chlorophenyl-N'-m-chloro—; column 11, line 62, for "8.8" read —81.8—; column 11, line 71, strike out "of", first occurrence; column 18, line 45, for "n-chloro" read —N-chloro—.

Signed and sealed this 13th day of June 1961.

[SEAL]

Attest:
ERNEST W. SWIDER,
*Attesting Officer.*

DAVID L. LADD,
*Commissioner of Patents.*